United States Patent [19]
Chase

[11] Patent Number: 6,025,890
[45] Date of Patent: *Feb. 15, 2000

[54] BEAM SPLITTER ELEMENT INCLUDING A BEAM SPLITTING LAYER AND A POLARIZING LAYER FOR USE IN A LIGHT POLARIZATION MODULATING DISPLAY SYSTEM

[75] Inventor: Holden Chase, Tucson, Ariz.

[73] Assignee: Displaytech, Inc., Longmont, Colo.

[*] Notice: This patent issued on a continued prosecution application filed under 37 CFR 1.53(d), and is subject to the twenty year patent term provisions of 35 U.S.C. 154(a)(2).

[21] Appl. No.: 09/026,762
[22] Filed: Feb. 20, 1998
[51] Int. Cl.[7] .............................. G02F 1/135; G02B 5/30
[52] U.S. Cl. ................... 349/9; 349/11; 349/25; 359/485; 359/502
[58] Field of Search ................... 349/9, 11, 25; 359/485, 487, 502

[56] References Cited

U.S. PATENT DOCUMENTS

| | | | |
|---|---|---|---|
| 4,653,875 | 3/1987 | Hines | 350/442 |
| 5,309,422 | 5/1994 | Kuroki et al. | 359/487 |
| 5,748,369 | 5/1998 | Yokota | 359/487 |
| 5,751,480 | 5/1998 | Kitagishi | 359/487 |

*Primary Examiner*—William L. Sikes
*Assistant Examiner*—Tarifur R. Chowdhury
*Attorney, Agent, or Firm*—Jay R Beyer; Steve C. Shear

[57] ABSTRACT

A display system includes a reflective mode spatial light modulator for producing a pattern of polarized light, a light source for illuminating the spatial light modulator, and an optics arrangement. The optics arrangement includes a beam splitter element having a transparent substrate with a front face and a back face. The front face supports a beam splitter coating acting as a beam splitter. The back face supports a polarizer layer. The polarizer layer and the transparent substrate are configured to be refractive index matched to prevent the reflection of light at the interface between the transparent substrate and the polarizer layer. The beam splitter element is positioned in the optical path between the light source and the spatial light modulator in order to polarize and direct light from the light source to the spatial light modulator. The beam splitter element is also positioned in the optical path between the spatial light modulator and a desired viewing area in order to direct light from the spatial light modulator to the viewing area.

15 Claims, 1 Drawing Sheet

BEAM SPLITTER ELEMENT INCLUDING A BEAM SPLITTING LAYER AND A POLARIZING LAYER FOR USE IN A LIGHT POLARIZATION MODULATING DISPLAY SYSTEM

BACKGROUND OF THE INVENTION

The present invention relates generally to beam splitters and more specifically to a beam splitter for use in a liquid crystal spatial light modulator display system.

In the display industry, there is continuous pressure to produce display systems with improved image quality. This is a particular concern for display systems in which a liquid crystal spatial light modulator is illuminated by a light source to produce the viewable image. In many configurations of this type of display system, a beam splitter is used as a main component of the optics for directing light from the light source through the system. In many cases, the various surfaces of the beam splitter may cause unwanted reflections of light which pass through the system resulting in ghosting problems associated with the images produced by the display system. For illustrative purposes, a prior art system of this type will be briefly described with reference to FIG. 1.

FIG. 1 illustrates a virtual image display system indicated by reference numeral 10. System 10 includes a light source 12 and a polarizer 14 for directing polarized light into a beam splitter element 16 as indicated by arrow 18. Beam splitter element 16 is a fifty/fifty beam splitter which includes a layer of beam splitting material 20 that reflects fifty percent of the incident light and passes fifty percent of the incident light regardless of the polarization of the light. Beam splitting material 20 is supported on a transparent substrate 22.

In this example, the polarized light indicated by arrow 18 represents P-polarized light. P-polarized light 18 is directed into a reflective, liquid crystal spatial light modulator (SLM) 24. SLM 24 includes an array of pixels, each of which modulates the light by controllably changing the polarization of the light directed into each pixel, thereby forming a pattern of modulated light that is reflected back into beam splitter element 16. This pattern of modulated light from SLM 24 includes both S-polarized light and P-polarized light depending upon the light modulating states of the pixels and is indicated by arrow 26.

Beam splitter element 16 splits modulated light 26 by reflecting half of the modulated light toward an analyzer 28 as indicated by arrow 30. The other half of the modulated light is allowed to pass through beam splitting element 16 as indicated by arrow 32. Analyzer 28 blocks a particular polarization of light, in this case P-polarized light, and allows the other polarization of light, in this case S-polarized light, to pass through analyzer 28 into a viewing area indicated by viewer 34.

As illustrated in FIG. 1, system 10 forms a viewable image by using SLM 24 to modulate the polarization of the light directed into the system. However, this configuration exhibits a ghosting problem that is caused by a back surface 36 of beam splitter element 16. As described above, half of the modulated light 26 from SLM 24 is passed by beam splitter element 16 as indicated by arrow 32. As this light passes through back surface 36, a portion of the light, referred to herein as a ghosting reflection and indicated by arrow 38, is reflected by surface 36 toward the viewer 34. This ghosting reflection 38 is caused by the difference in the refractive index of the transparent substrate 22 of the beam splitter element and the air surrounding the beam splitting element. Because this ghosting reflection light 38 is slightly displaced relative to the light which was reflected by beam splitting material 20 (indicated by arrow 30), it creates a ghost image that is slightly displaced relative to the image that is intended to be produced by the system.

Depending on the material used as the transparent substrate, the ghost image may be fairly easily distinguished when a viewer views the display system. For example, using a glass substrate, the ghosting image may be in the range of about five percent of the brightness of the image that is intended to be produced by the display. A ghost image of this brightness is typically considered to be incompatible with the image quality expected of modern display systems of this type. Therefore, it is desirable to provide a more efficient beam splitter element which reduces or eliminates this ghosting problem. The present invention provides a beam splitter element that substantially eliminates this ghosting problem.

SUMMARY OF THE INVENTION

As will be described in more detail hereinafter, a display system including a beam splitter is herein disclosed. The display system includes a reflective mode spatial light modulator for producing a pattern of polarization modulated light, a light source for illuminating the spatial light modulator, and an optics arrangement. The optics arrangement includes a beam splitter element having a transparent substrate with a front face and a back face. The front face supports a beam splitter coating acting as a beam splitter. The back face supports a polarizer layer. The polarizer layer and the transparent substrate are configured to be refractive index matched to prevent the reflection of light at the interface between the transparent substrate and the polarizer layer. The beam splitter element is positioned in the optical path between the light source and the spatial light modulator in order to polarize and direct light from the light source to the spatial light modulator. The beam splitter element is also positioned in the optical path between the spatial light modulator and a desired viewing area in order to direct light from the spatial light modulator to the viewing area.

BRIEF DESCRIPTION OF THE DRAWINGS

The features of the present invention may best be understood by reference to the following description of the presently preferred embodiments together with the accompanying drawings.

DETAILED DESCRIPTION OF THE PREFERRED EMBODIMENTS

An invention is herein described for providing and producing a beam splitter element for use in a display system. In the following description, numerous specific details are set forth in order to provide a thorough understanding of the present invention. However, in view of this description, it will be obvious to one skilled in the art that the present invention may be embodied in a wide variety of specific configurations. In order not to unnecessarily obscure the present invention, known manufacturing processes such as conventional processes used to produce beam splitting films and polarizing films will not be described in detail. Also, the various components other than a beam splitter which are used to produce a display system will not be described in detail in order not to unnecessarily obscure the present invention. These other components include, but are not limited to, light sources, analyzers, and liquid crystal spatial light modulators. These components are known to those skilled in the art of liquid crystal spatial light modulator display systems.

Figure 2:
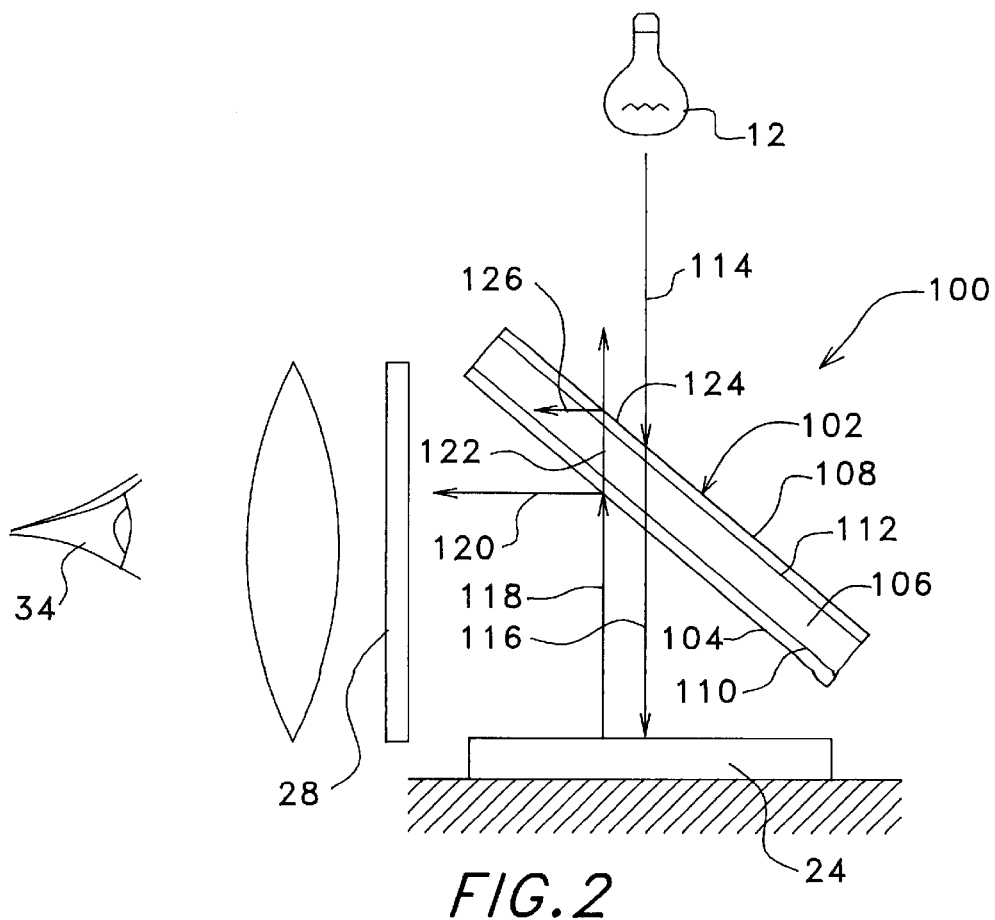
FIG. 2 is a diagrammatic illustration of a display system including the beam splitter element designed in accordance with the present invention.

Referring now to FIG. 2, a display system 100 designed in accordance with the present invention will be described. System 100 has a configuration similar to system 10 described above in the background. For purposes of clarity, like reference numerals will be used to indicate like components throughout the various figures. As illustrated in FIG. 2 and as described above for system 10, system 100 includes light source 12, SLM 24, analyzer 28, and a viewing area represented by viewer 34. However, system 100 includes a beam splitter element 102 designed in accordance with the invention.

Figure 1:
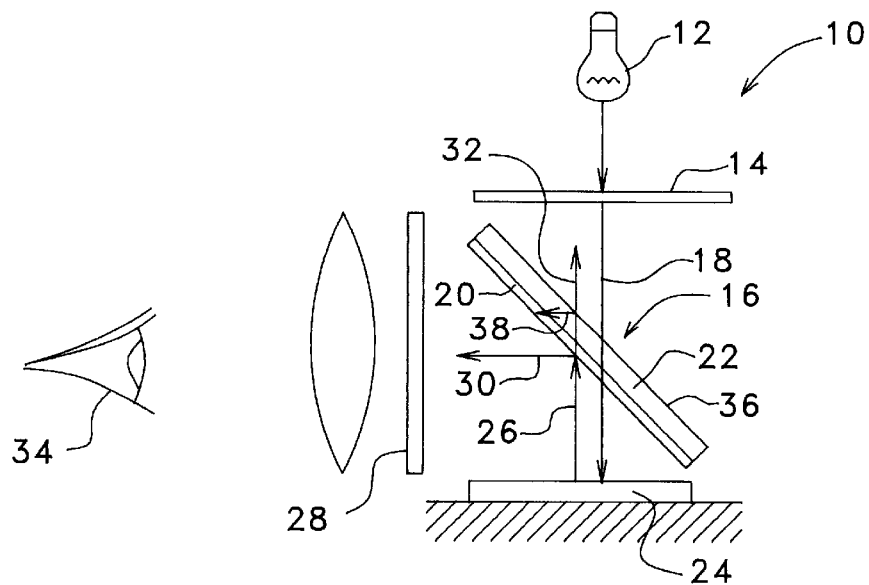
FIG. 1 is a diagrammatic illustration of a display system including a prior art beam splitter element.

In accordance with one embodiment of the invention, beam splitter element 102 is made up of three layers of material indicated by layers 104, 106, and 108. The first layer 104 of beam splitter element 102 is a layer of beam splitting material similar to beam splitting material 20 described above for FIG. 1. Beam splitting layer 104 may be any suitable and readily providable beam splitting material such as, but not limited to, dielectric or metallic coatings. Beam splitter layer 104 may have a 50/50 transmit/reflect ratio, or may have other larger or smaller ratios. Layer 104 may be substantially polarization independent, or may act to a greater or lesser degree as a polarizing beam splitter. Although several specific examples of beam splitting materials have been described, it should be understood the present invention would equally apply regardless of the specific beam splitting material used for beam splitting layer 104.

Layer 106 of beam splitter element 102 is a layer of transparent material which serves as a substrate to support beam splitting layer 104 in a manner similar to that described above for beam splitter element 16 of system 10. Substrate layer 106 has a front face 110 and a back face 112. Front face 110 is used to support beam splitting layer 104 and back face 112 is used to support layer 108 as will be described in more detail hereinafter. Any material may be used for substrate layer 106 so long as the material is substantially transparent. In one preferred embodiment, layer 106 of beam splitter element 102 is a layer of glass. Alternatively, transparent layer 106 may be a transparent plastic material.

In accordance with the invention, beam splitter element 102 also includes layer 108. Layer 108 is a polarizer layer of polarizing material that is attached and supported on back face 112 of substrate layer 106 of beam splitter element 102. Polarizer layer 108 of beam splitter element 102 serves the same purpose as polarizer 14 of system 10, that is, polarizer layer 108 is used to allow light of only one polarization to be directed into SLM 24. However, polarizer layer 108 also serves an additional purpose.

In accordance with the invention, polarizer layer 108 is substantially refractive index matched to the refractive index of transparent substrate layer 106. This refractive index matching between substrate layer 106 and polarizer layer 108 substantially prevents any reflection of incident light at the junction between these two layers. Therefore, as will be described in more detail hereinafter, this configuration substantially eliminates the ghosting problems described in the background. Polarizer 108 is of a type that absorbs the polarization opposite to that which it transmits. An example of a suitable polarizer type is a polarizer made of stretched polyvinyl alcohol film dyed with iodine. This type of polarizer is sold by the Polaroid Corporation, (e.g. HN 38).

Now that the configuration of system 100 has been described, the operation of display system 100 will be described in detail. As illustrated in FIG. 2, light is directed into the system from light source 12 as indicated by arrow 114. In this example, polarizer layer 108 is designed to pass P-polarized light and absorb or block S-polarized light. Therefore, only P-polarized light is allowed to pass through beam splitter element 102 and into SLM 24 as indicated by arrow 116.

As described above for system 10, SLM 24 includes an array of pixels, each of which modulates the light by controllably changing the polarization of the light directed into each pixel, thereby forming a pattern of modulated light that is reflected back into beam splitter element 102. This pattern of modulated light from SLM 24 includes both S-polarized light and P-polarized light depending upon the light modulating states of the pixels and is indicated by arrow 118. In a manner similar to that described above for FIG. 1, beam splitting layer 104 of beam splitter element 102 splits modulated light 118 by reflecting a portion of the modulated light toward analyzer 28 as indicated by arrow 120. The other portion of the modulated light is allowed to continue passing through beam splitting element 102 as indicated by arrow 122.

As described above for system 10, analyzer 28 blocks a particular polarization of light, in this case P-polarized light, and allows the other polarization of light, in this case S-polarized light, to pass through analyzer 28 into a viewing area indicated by viewer 34. This light which passes through analyzer 28 forms a viewable image that is determined by how SLM 24 modulates the polarization of the light directed into the system.

The difference between the operation of system 10 and system 100 comes about due to the difference in the way system 100 operates on the portion of the light which is allowed to pass through beam splitting layer 104 of beam splitting element 102, that is the light indicated by arrow 122. Because polarizer layer 108 and transparent substrate layer 106 are refractive index matched in accordance with the invention, there is substantially no reflection caused at the junction between these two layers. Also, since polarizer layer 108 is configured to absorb S-polarized light and pass only P-polarized light, only P-polarized light is allowed to pass through polarizer layer 108. If there is any reflection of light caused by the junction between the outer surface of polarizer layer 108, indicated by surface 124, and the air surrounding beam splitter element 102, this reflected light is only P-polarized light (indicated by arrow 126 in FIG. 2) since substantially all S-polarized light in beam 122 is absorbed by polarizer 108 before this light strikes surface 124. Since reflected light 126 is only P-polarized light and since analyzer 28 blocks substantially all P-polarized light, substantially none of this reflected light is able to reach viewer 34. Therefore, the configuration of system 100 substantially eliminates the ghosting problem described above with reference to FIG. 1.

The configuration of system 100 also provides an second benefit in addition to the benefit of substantially eliminating the ghosting problem. Because polarizer layer 108 acts as the polarizer for the system, this configuration eliminates the need to provide a separate polarizer for polarizing the light directed into the system. In a system such as system 10 described above, polarizer 14 and beam splitter element 16 would be provided as two separate elements. However, with the configuration of system 100, these two elements are combined into a single element, thereby reducing the complexity of the system and reducing the costs of producing the display system.

Although polarizer layer 108 has been described as blocking S-polarized light and analyzer 28 has been described as blocking P-polarized light, this is not a requirement of the invention. Instead, it should be understood that the polarizer layer and the analyzer may be configured to block any opposite polarizations of light. For example, polarizer layer 108 may be configured to block P-polarized light and analyzer 28 may be configured to block S-polarized light.

Although only one specific embodiment of the invention has been described above in detail, it is to be understood that the present invention may be embodied in a wide variety of alternative forms and still remain within the scope of the invention. Any of these various embodiments would equally fall within the scope of the invention so long as a polarizing material for preventing the ghosting reflection is provided on a surface of the beam splitter element. Furthermore, although only one specific configuration of a display system using the novel beam splitter has been described, it is to be understood that the present invention would equally apply to any display system which utilizes a beam splitter in accordance with the invention.

Although the beam splitter and display system have been described with their various components having particular respective orientations, it should be understood that the present invention may take on a wide variety of specific configurations with the various components being located in a wide variety of positions and mutual orientations and still remain within the scope of the present invention. Therefore, the present examples are to be considered as illustrative and not restrictive, and the invention is not to be limited to the details given herein, but may be modified within the scope of the appended claims.

What is claimed is:

1. An image-forming system comprising:
    a reflective spatial light modulator for modulating incident polarized light to produce a pattern of polarized light;
    a light source for illuminating the spatial light modulator;
    a first optical path extending from the light source to the spatial light modulator;
    an image forming arrangement for forming an image of the spatial light modulator within a viewing area;
    a second optical path extending from the spatial light modulator to the viewing area;
    a polarizing analyzer located along the second optical path for converting the pattern of polarized light into a corresponding pattern of light intensity; and
    a beam splitter element located along the first optical path between the light source and the spatial light modulator and also located along the second optical path between the spatial light modulator and the polarizing analyzer, the light source, beam splitter element, and spatial light modulator being positioned such that the portions of the first and second optical paths between the beam splitter element and the spatial light modulator are coincident, the beam splitter element consisting of
        a transparent substrate having a front surface and a back surface, the beam splitter element and the light source being positioned such that light from the light source is directed along the first optical path into the back surface of the transparent substrate toward the spatial light modulator,
        a beam splitting layer supported by the transparent substrate for controlling the light reflecting characteristics of the beam splitter element, and
        a polarizer layer attached to the back surface of the beam splitter element, the polarizer layer being configured to (i) polarize the light from the light source that is directed alone the first optical path into the spatial light modulator as well as (ii) cooperate with the beam splitting layer and transparent substrate to control the light reflecting and transmitting characteristics of the beam splitter element.

2. A system according to claim 1 wherein the polarizer layer and the transparent substrate are configured to be substantially reflective index matched to prevent the reflection of light at the interface between the transparent substrate and the polarizer layer.

3. A system according to claim 1 wherein the beam splitter element is a fifty/fifty beam splitter element that passes approximately fifty percent of any incident light and reflects approximately fifty percent of any incident light.

4. A system according to claim 1 wherein the beam splitter element is substantially polarization independent.

5. A system according to claim 1 wherein the polarizer layer absorbs light of one polarization.

6. A beam splitting element for use in and image-forming system including a reflective spatial light modulator for producing a pattern of polarized light and a light source for illuminating the spatial light modulator, the beam splitting element consisting of:
    a transparent substrate having a front surface and a back surface, the beam splitter element and the light source being positioned such that light from the light source is directed along a first optical path into the back surface of the transparent substrate toward the spatial light modulator,
    a beam splitting layer supported by the transparent substrate for controlling the light reflecting characteristics of the beam splitter element, and
    a polarizer layer attached to the back surface of the beam splitter element, the polarizer layer being configured to (i) polarize the light from the light source that is directed along the first optical path into the spatial light modulator as well as (ii) cooperate with the beam splitting layer and transparent substrate to control the light reflecting and transmitting characteristics of the beam splitter element.

7. A beam splitting element according to claim 6 wherein the polarizer layer and the transparent substrate are configured to be substantially refractive index matched to prevent the reflection of light at the interface between the transparent substrate and the polarizer layer.

8. A beam splitting element according to claim 6 wherein the beam splitter element is a fifty/fifty beam splitter element that passes approximately fifty percent of any incident light and reflects approximately fifty percent of any incident light.

9. A beam splitting element according to claim 6 wherein the beam splitter element is substantially polarization independent.

10. A beam splitting element according to claim 6 wherein the polarizing layer absorbs light of one polarization.

11. In an image-forming system including a reflective mode spatial light modulator for producing a pattern of polarized light and a light source for illuminating the spatial light modulator, a method of reducing a ghost reflection in the system that is caused by the reflection of light from a back face of a beam splitter element in the display system, the method comprising the steps of:

provseiding a beam splitter element consisting of a transparent substrate with a front face and a back face, a beam splitter coating supported by the transparent substrate that acts as a beam splitter and a polarizer layer supported on the back face of the transparent substrate; and placing the beam splitter element between the light source and the spatial light modulator such that light from the light source is directed along a first optical path through the polarizer layer into the back face of the transparent substrate and then into the spatial light modulator and such that the beam splitter element directs light along a second optical path from the spatial light modulator to a desired viewing area, the polarizer layer, beam splitting layer, and transparent substrate of the beam splitter element cooperating to control the light reflecting and transmitting characteristics of the beam splitter element.

12. A method according to claim 11 wherein the polarizer layer and the transparent substrate are configured to be substantially refractive index matched to prevent the reflection of light at the interface between the transparent substrate and the polarizer layer.

13. A method according to claim 11 wherein the beam splitter element is a fifty/fifty beam splitter element that passes approximately fifty percent of any incident light and reflects approximately fifty percent of any incident light.

14. A method according to claim 11 wherein the beam splitter element is substantially polarization independent.

15. A method according to claim 11 wherein the polarizing layer absorbs light of one polarization.

* * * * *